United States Patent
Cai et al.

(10) Patent No.: US 7,535,988 B2
(45) Date of Patent: May 19, 2009

(54) METHOD FOR FAST IMAGE RECONSTRUCTION WITH COMPACT RADIATION SOURCE AND DETECTOR ARRANGEMENT USING COMPUTERIZED TOMOGRAPHY

(75) Inventors: Qingzhong (James) Cai, Plano, TX (US); Andrew Blanchard, Murphy, TX (US); Jeffry Golden, Creve Coeur, MO (US)

(73) Assignee: Clean Earth Technologies, LLC, Earth City, MO (US)

( * ) Notice: Subject to any disclaimer, the term of this patent is extended or adjusted under 35 U.S.C. 154(b) by 28 days.

(21) Appl. No.: 10/855,453

(22) Filed: May 27, 2004

(65) Prior Publication Data
US 2004/0240603 A1 Dec. 2, 2004

Related U.S. Application Data

(60) Provisional application No. 60/473,518, filed on May 27, 2003.

(51) Int. Cl.
*A61B 6/00* (2006.01)
(52) U.S. Cl. .............. 378/10; 378/4; 378/38; 378/57
(58) Field of Classification Search ............ 378/14, 378/4, 11–13, 901, 10, 38, 57, 14.4
See application file for complete search history.

(56) References Cited

U.S. PATENT DOCUMENTS

| | | | | |
|---|---|---|---|---|
| 4,303,829 A | * | 12/1981 | Wagner | 378/4 |
| 4,636,952 A | | 1/1987 | Crawford | 364/414 |
| 4,740,896 A | * | 4/1988 | Horiba et al. | 378/4 |
| 5,126,938 A | | 6/1992 | Oda | 364/413 |
| 5,265,142 A | * | 11/1993 | Hsieh | 378/4 |
| 5,333,164 A | | 7/1994 | Tam | 378/8 |
| 5,406,479 A | | 4/1995 | Harman | 378/7 |
| 6,018,562 A | * | 1/2000 | Willson | 378/9 |
| 6,325,537 B1 | * | 12/2001 | Watanabe | 378/197 |
| 6,411,674 B1 | * | 6/2002 | Oikawa | 378/21 |
| 6,415,012 B1 | * | 7/2002 | Taguchi et al. | 378/15 |
| 7,016,457 B1 | * | 3/2006 | Senzig et al. | 378/19 |
| 7,106,830 B2 | * | 9/2006 | Rosner | 378/146 |
| 7,108,421 B2 | * | 9/2006 | Gregerson et al. | 378/197 |
| 2002/0154727 A1 | | 10/2002 | Ning | 378/4 |
| 2004/0114710 A1 | * | 6/2004 | Ozaki | 378/9 |
| 2004/0179643 A1 | * | 9/2004 | Gregerson et al. | 378/4 |
| 2005/0175143 A1 | * | 8/2005 | Miyazaki et al. | 378/19 |

OTHER PUBLICATIONS

PCT/US2004/016909, International Search Report.

* cited by examiner

*Primary Examiner*—Edward J Glick
*Assistant Examiner*—Alexander H Taningco
(74) *Attorney, Agent, or Firm*—Kang Intellectual Property Law LLC; Grant D. Kang

(57) ABSTRACT

This invention presents a method of image reconstruction based on static and irregular detector positioning using fan-beam back projection technique of computerized tomography.

10 Claims, 8 Drawing Sheets

METHOD FOR FAST IMAGE RECONSTRUCTION WITH COMPACT RADIATION SOURCE AND DETECTOR ARRANGEMENT USING COMPUTERIZED TOMOGRAPHY

CROSS-REFERENCE TO RELATED APPLICATIONS

This application claims priority to U.S. application No. 60/473,518, filed on May 27, 2003.

STATEMENT REGARDING FEDERALLY SPONSORED RESEARCH OR DEVELOPMENT

The United States Government has rights in this invention pursuant to Contract No. DASG60-02-C-0015 with the United States Department of Army Space and Missile Defense Command in which the University of Missouri-Columbia was the prime contractor.

APPENDIX

Not Applicable.

FIELD OF THE INVENTION

This invention relates to image reconstruction methods and apparatus, and in particular to methods of and apparatus for image reconstruction using fan beam computerized tomography technology.

BACKGROUND OF THE INVENTION

Computed tomography (CT) is an imaging technology in which an array of detectors is used to collect data from probing energetic rays transmitted through or emitted from an imaged subject. The collected data (also referred to as projection data) of the detector array contain the spatially integrated effects of the attenuation of the beam going through the imaged subject, which in turn indirectly represent a view of the internal structural details, i.e., features, of the imaged subject.

Such projection can be taken from different angles in a plane to collect a more complete view of the imaged subject. CT is the set of methods whereby a sufficient set of projection data is mapped by a mathematical inversion transformation algorithm to reconstruct the original image of the subject on the plane of projection. Intensive data processing following a reconstruction algorithm is required to convert the raw projection data into a recognizable view of the internal features of the subject. The image data are generated from the structure information indirectly represented by the projections.

This is possible simply because of the Fourier Slice Theorem, which states generally that a projection view of an imaged subject is related by Fourier transformation to the spatial structure of the subject. More specifically, the one dimensional Fourier transform of a parallel projection at a given view angle $\theta$ is equivalent to a one-dimensional "slice" of the two-dimensional Fourier transform of the imaged subject, taken at the same angle $\theta$ in the frequency domain. The Fourier Slice Theorem allows the image to be reconstructed by Fourier transforming the collected data from parallel projection, assembling the transforms into a two-dimensional Fourier transform, and applying inverse Fourier transformation to the result. In practical applications this process may be implemented by some form of filtered back-projection, which applies inverse two dimensional Fourier transform on the Fourier transform of each projection, without waiting for the completion of the collection of all the projection data.

The resolution of the generated image will depend on the spacing of the projections in $\theta$ and the spacing of detectors. The more projections that are taken and the closer the detectors are placed to each other, the greater the resolution of the resulting image.

In practice, fan beam projections are used much more often than the parallel projection because of the simplicity of the configuration comprising a single point source of radiation from which emanates a fan-shaped beam. The detector array is situated along an arc whereby the angle between the rays from the radiation source and the adjacent detectors remains a constant. Fan beam projection also makes it possible to avoid rotating the source of radiation, as required in the case of parallel projection, and to achieve much faster data acquisition and longer life of the equipment. Usually fan beam projection can have detectors separated equi-angularly on a curve or equally spaced along a straight line.

CT techniques are valuable in a wide range of application areas where noninvasive and nondestructive examination of internal structures is needed. Medical applications include imaging of emissions from radioactive substances introduced into the subject (single photon emission CT, positron emission CT, etc.), as well as x-ray transmission CT. Non-medical applications include, for example, non-destructive testing and inspection, mineral deposit mapping (microseismic CT imaging), and three-dimensional image generation in electron microscopy.

The most frequently used fan beam back projection algorithms require the detectors to be either equally spaced on a straight line or situated equi-angularly on a curve. In order to strictly follow this requirement, usually one must rotate the detector bank for each angle of the projections. This detector rotation definitely limits the data acquisition speed.

Because of the restrictive spatial requirement of many applications, e.g., packaging space, overall size, or aperture shape or geometry of the subject image, it is desirable that the detector array be situated in very close proximity to and just outside of the perimeter, i.e., confining contour, of the subject image to save space for the overall image capture assembly or component. At the same time, all of the radiation sources and the detectors are static, therefore no rotating parts are necessary. This not only extends the life time of overall assembly or component, more importantly, it reduces the data acquisition time.

One such example of a space constrained use of CT is the photonic readout of an image in a focal plane array that is coupled pixel by pixel to an electro-optical, acousto-optic, or piezo-electric element. Such an array may comprise a set of detectors or pixels that have optical, electrical, acoustic, or other characteristics, which alter the transmission of a probing energetic ray.

SUMMARY OF THE INVENTION

The invention is a method to reconstruct a subject image, or construct an image of an object of interest, and its internal structural details from the projection data collected by detectors with the geometrical arrangement wherein the static radiation sources and detectors are positioned in close proximity to the boundary of and just outside of the subject image or object. The probing radiation source emits a fan beam facing the center of the subject image. The larger the opening angle of the fan, the more data can be collected in each projection. In general, there is no advantage for the angular width, i.e., the opening angle of the fan beam, to be greater than 180°.

The geometrical position of the probing radiation sources and detectors can be equally spaced for the ease of the detector deployment. The probing radiation source or sources and detectors also may be situated on an image containing contour of simple geometry, e.g., circle or square. In some special situations, radiation sources/detectors can even be situated on a contour of an irregular shape. All the radiation sources are facing the center of the imaged subject. Although the detectors may be situated differently for different application, the detected signal values can be mapped to an imaginary detector bank and then interpolated into an equal spaced setting so that the traditional equi-angular or equi-spaced back projection algorithms can be applied. The number of sources and detectors must be sufficient for the desired resolution and will certainly affect the fidelity of the image reconstruction with the actual imaged object.

To determine the number radiation sources/detectors and the position for the irregular shaped situation, one must determine the number of data samples needed on the imaginary detector bank. A software emulation system can be built to check the results of different configurations. In such an emulator, data corresponding to a known test image is first sampled and then integrated to form a projection data set. The reconstruction method is then performed to produce the reconstructed image. The reconstruction is then compared with the known test image to determine the resolution. The test image should be chosen to have high contrast features with well defined shapes and be of a size of the desired resolution. By varying the number of sources and detectors for a specified configuration, the cases with emulator results that have the desired resolution can be identified.

Because the multiple radiation sources and detectors are situated close to or immediately outside of the imaged subject, radiation sources can be made to emit in time sequence so that no moving part is needed and the switching from one radiation source to the next can be much faster than traditional moving radiation source.

Furthermore, because the geometric setting of the system is fixed during the operation once the radiation sources/detectors are situated, it is possible to pre-calculate the mapping and the interpolation scheme based on the angle and position of each different radiation source and the positions of the radiation detectors. This will further reduce the data processing time. It is especially useful when radiation sources and detectors are situated along the contour of an irregular shape.

The method comprising the invention consists of several steps. The first step is to solve the problem of mapping the detectors along the contour of the subject image (or the image containing circle or square of the subject image) to an imaginary detector bank (a curve in the case of a circle or a straight line in the other cases). The projection data collected by the real detectors is considered the projection data collected by the imaginary detector bank provided that sufficiently small energy, i.e., signal, loss occurs outside of the subject image.

The next step is to perform interpolation on the imaginary detector bank as necessary to obtain the projection data value for the equally spaced detectors on the imaginary bank. It is generally to be noticed after the mapping, that the imaginary detectors are no longer equally spaced as the real detectors may have been. After the interpolation, the image reconstruction problem can be solved with the traditional techniques of equiangular fan beam projection or the fan beam projection with equally spaced detectors on a straight line.

The speed of data acquisition can be further dramatically improved by employing multiple radiation sources to emit simultaneously on different wavelengths. In conjunction with such sources, the detectors are required to have the capability of reading projections at different wavelengths at the same time.

A set of discrete radiation sources that emit more than one wavelength simultaneously may be used with detectors that have discernible responses to particular wavelengths. When the number of wavelengths is fewer than the number of radiation sources, it is necessary sequentially to cause the radiation sources to emit in a time sequence, i.e., to switch the radiation sources on and off in a time sequence. However, the number of switchings is fewer than in the single wavelength case, which in turn reduces the total data acquisition time. This also promotes the parallel processing of calculating the mapped and interpolated data simultaneously.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawing in which:

DETAILED DESCRIPTION OF THE INVENTION

Figure 1:
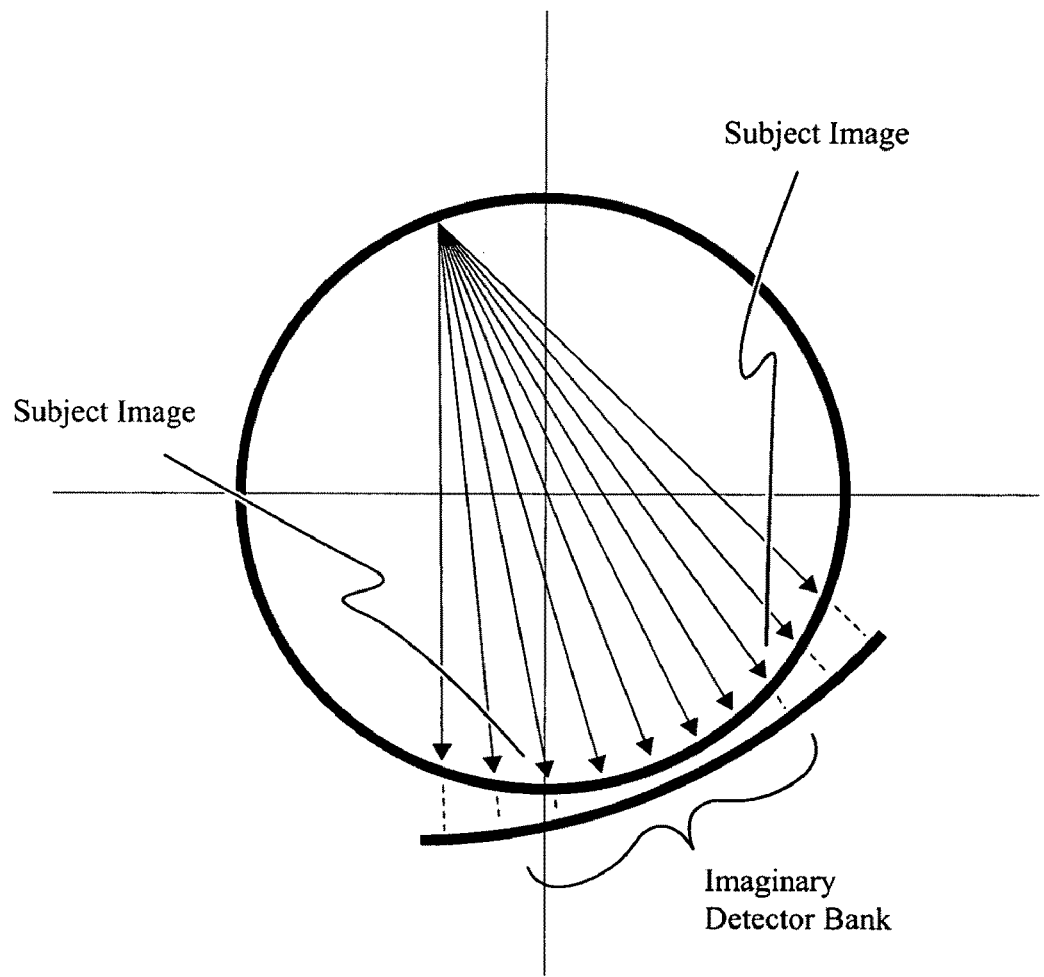
FIG. 1 is a schematic diagram of a fan beam projection with the radiation source and detectors deployed equally spaced on a circle that is immediately outside of the subject image.

FIG. 1 is a schematic diagram of a fan beam projection with all the radiation sources and detectors deployed equally spaced on the circle that is immediately outside of the subject image. Such deployment and other deployments in the invention are static with no moving parts involved. If the subject image is overall in a circle shape or the circle deployment does not violate the space requirement of the application, such circle deployment is the simplest design for fast and static data acquisition. In order to directly apply the back projection image reconstruction based on equi-angular fan beam projection, an imaginary detector bank on the curve with radius equivalent to the diameter of the detector circle can be constructed. In a time sequence, each radiation source on the circle can be lit in a certain fan beam angle and the detectors on the opposite side will collect the projected signals. These projected signals can be mapped to the imaginary detector bank, so that the back projection algorithm can be applied to reconstruct the subject image.

Figure 2:
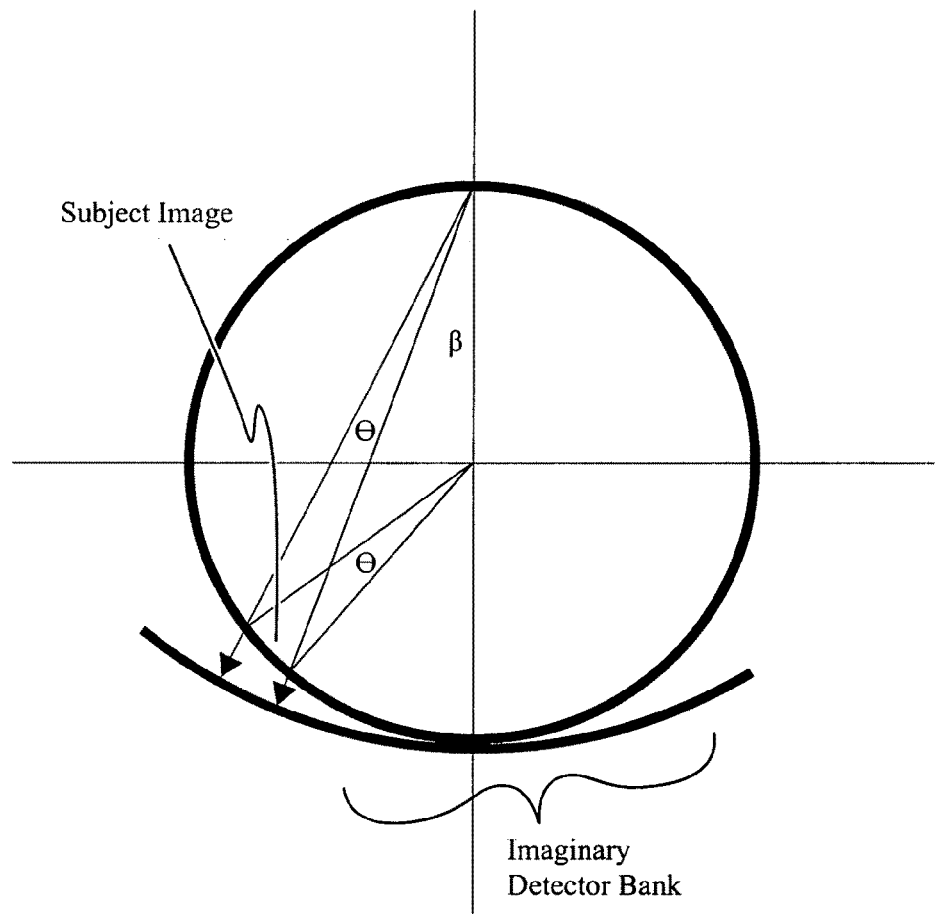
FIG. 2 is a schematic diagram illustrating the geometry relationship between the angle of rays for two neighboring detectors from the radiation source θ' and the angle of rays for two neighboring detectors from the center of the circle θ.

FIG. 2 is a schematic diagram illustrating the geometry relationship between the angle of rays for two neighboring detectors from the radiation source θ' and the angle of rays for two neighboring detectors from the center of the circle θ. The circle is the rim that all the radiation sources and detectors are deployed on with equal spacing. Assuming that the two detectors under consideration in FIG. 2 are nth and (n−1)th detector from the lowest point of the circle and the angle between the vertical line going the center of the circle and the ray from the radiation source to the (n−1)th detector is β, we can have $$n\theta = 2(\theta' + \beta) \text{ and}$$

$$2\beta = (n-1)\theta.$$

Therefore the geometric relationship shows that $$\theta' = \theta/2.$$

Since θ is fixed due to the equally spaced deployment, the imaginary detectors on the imaginary detector bank also become equally spaced. Therefore no signal value interpolation is needed before the equi-angular fan beam back projection algorithm (with step angle θ') is applied. This demonstrates the simplicity of the approach of the deployment on circle.

Figure 3:
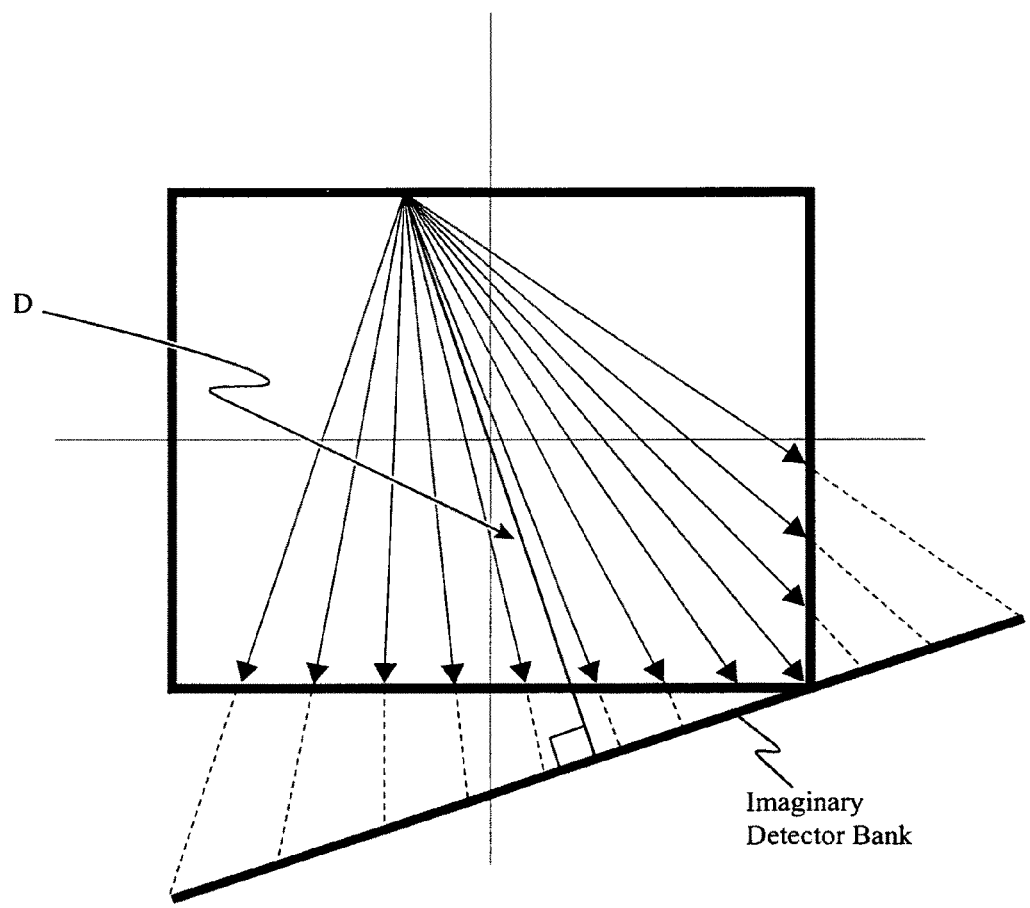
FIG. 3 is a schematic diagram of a fan beam projection where all the radiation sources and detectors are deployed equally spaced on the square that is immediately outside of the subject image.

FIG. 3 is a schematic diagram of a fan beam projection where all the radiation sources and detectors are deployed equally spaced on a square that is immediately outside of the subject image. This is more appropriate for the application where the subject image is in a square or rectangular shape and there is no room for circular deployment as in FIG. 1. As in the case of FIG. 1, each radiation source is transmitting signal in a certain angle of fan beam facing directly to the center of the square in sequence. When a radiation source is transmitting signals, the detectors on the opposite side collect the projection signals and these data are mapped to an imaginary detector bank. The imaginary detector bank is a straight line that is immediately outside of the detector square and perpendicular to the line from the radiation source to the center of the detector square. When all of the radiation sources have transmitted signals once, the projection data collection is complete. The distance from the radiation source to the center of the imaginary detector bank is D.

Figure 4:
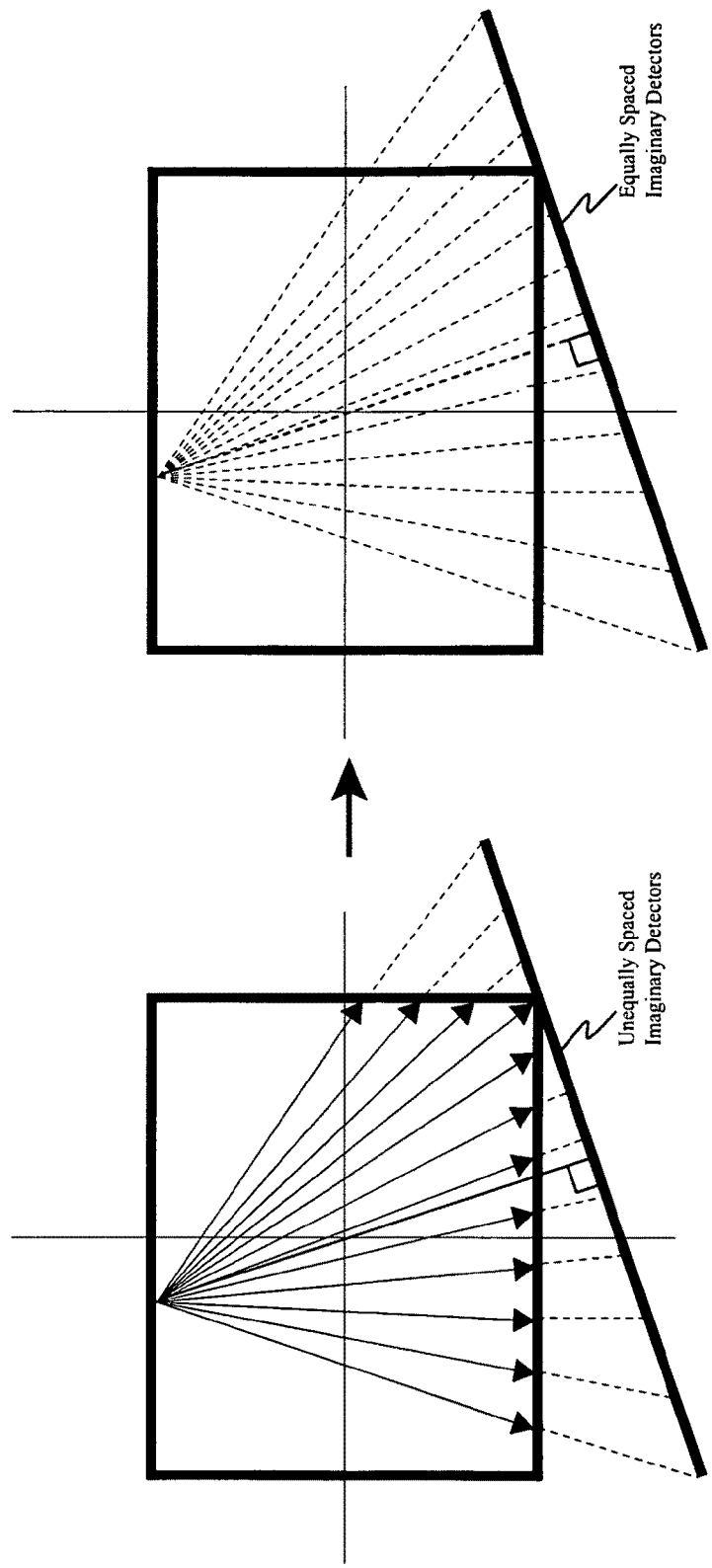
FIG. 4 is a schematic diagram of a system of unequally spaced imaginary detectors transformed to a system of equally spaced imaginary detectors.

FIG. 4 is a schematic diagram of the transformation from the unequally spaced imaginary detectors to equally spaced imaginary detectors. To achieve the easiness of deploying the radiation sources and detectors in the case of squared deployment, these components are equally spaced along the rim of the square. Therefore imaginary detectors on the imaginary bank demonstrated in FIG. 3 are no longer equally spaced. Interpolation is needed to convert the received signals into equally spaced positions. Linear interpolation or Lagrange interpolation can be applied here. The interpolated data can be used in the equi-spaced fan beam back projection image reconstruction algorithm.

Figure 5:
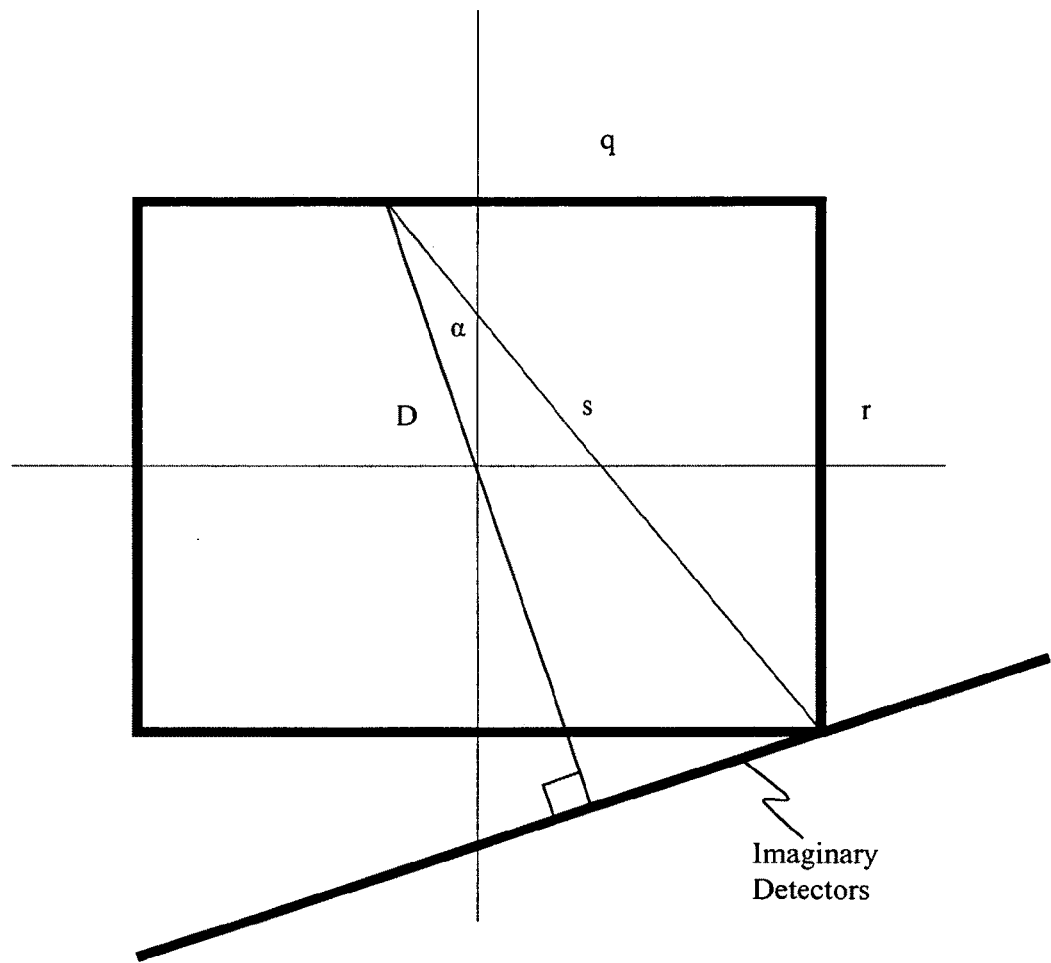
FIG. 5 is, in the case of deploying of radiation sources/detectors on the rim of a square, a schematic diagram finding the distance from the radiation source to the center of the imaginary detector bank.

FIG. 5 is a schematic diagram of finding the distance from the radiation source to the center of the imaginary detector bank in the case of deploying radiation sources/detectors on the rim of a square. The distance D is critical in the equi-space fan beam back projection. Since it could be different for each radiation source, we have to calculate out D individually for each radiation source on half of the square. D can be calculated out through the distance s from the radiation source to the corner of the square, and the angle α.

$$D = s \cos \alpha, \text{ where } \alpha = \arctan(r/2/(q - r/2)) - \arctan(r/q)$$

Figure 6:
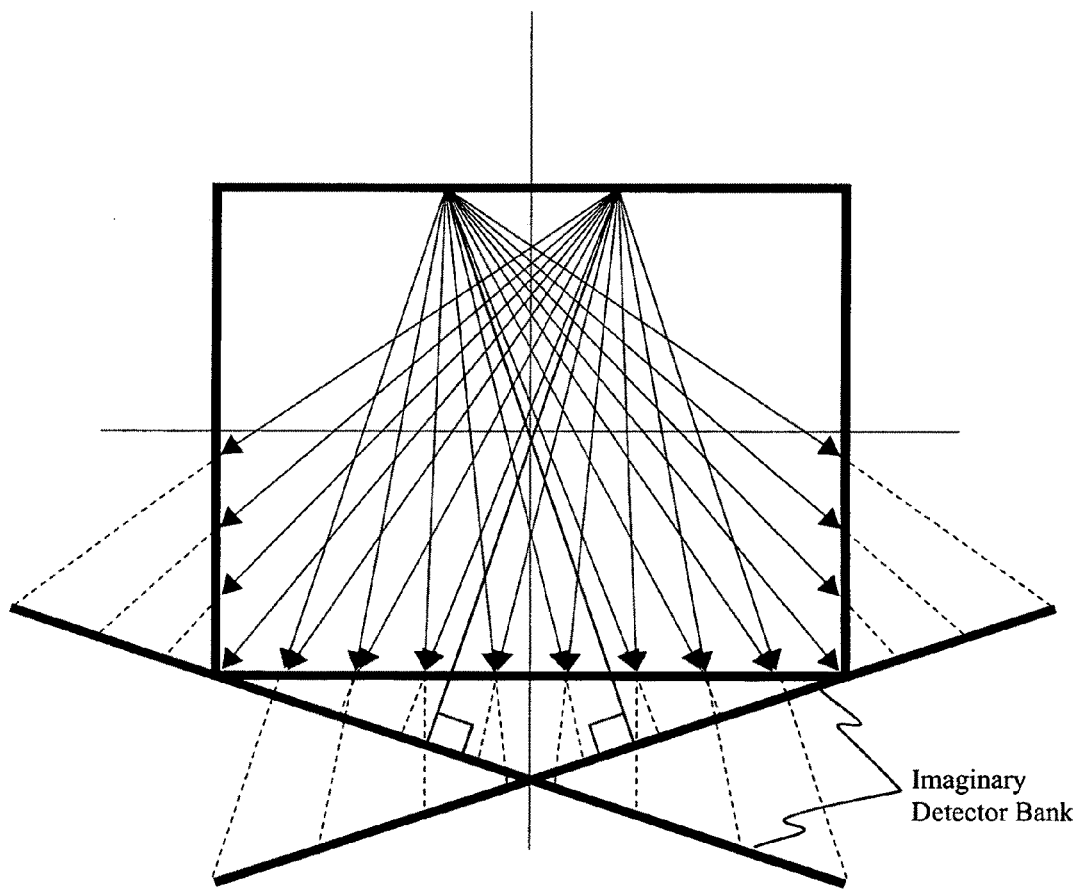
FIG. 6 is a schematic diagram of multiple radiation sources emanating at different wavelengths simultaneously in order to save data acquisition time.
Figure 7:
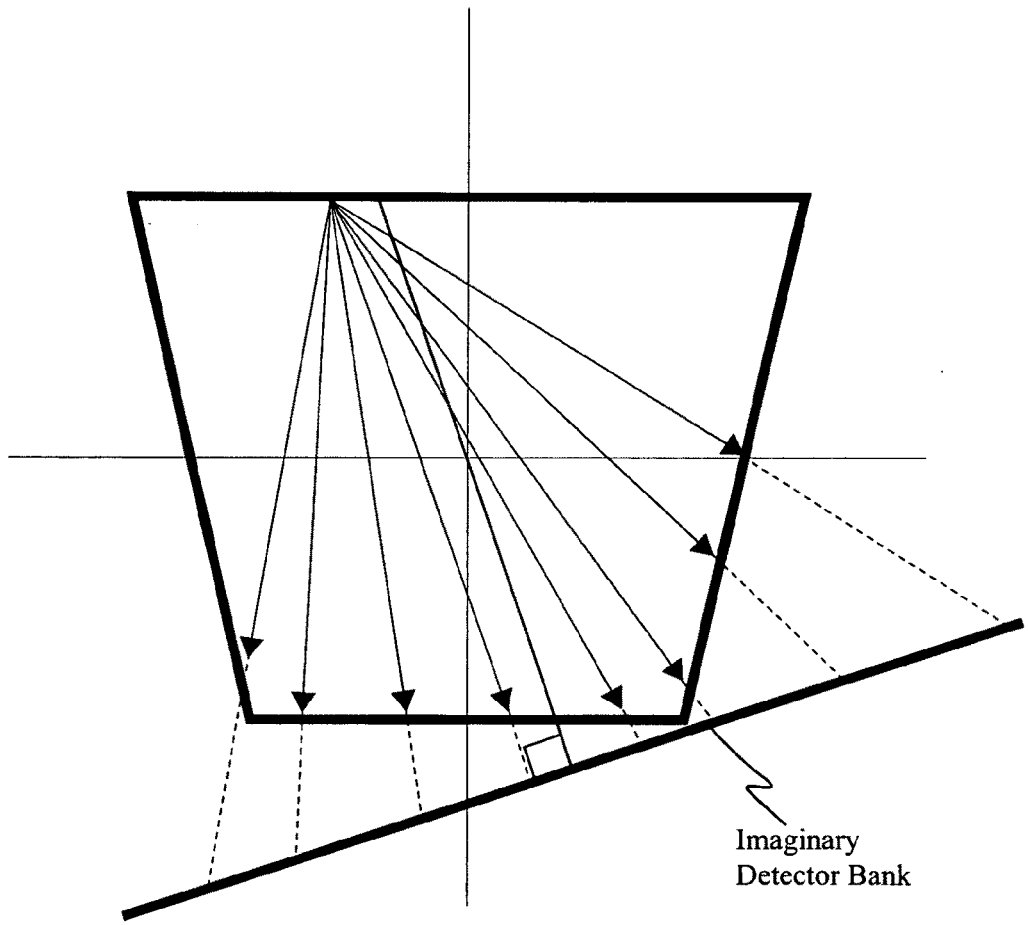
FIG. 7 illustrates a quadrilateral as a representation of an irregular contour on which the sources and detectors may be situated. (The selection of a quadrilateral is entirely arbitrary and is for illustrative purposes only.)

The speed of data acquisition can be further dramatically improved by employing multiple radiation sources to emit simultaneously on different wavelengths. In conjunction with such sources, the detectors are required to have the capability of reading projections at different wavelengths at the same time. FIG. 6 is a schematic diagram of multiple radiation sources emanating at the different wavelengths simultaneously in order to save data acquisition time. If a detector is only sensible to one wavelength, we have to light the radiation source sequentially in time. But when a detector is able to detect signals at different wavelength, the radiation source of different wavelength can be lit simultaneously. Suppose we have N radiation sources and W wavelength, we need to have N times of sequential switching for the case of using only one wavelength, while we can have only ⌈N/W⌉ times of sequential switching. Parallel processing is possible in the case to allow different processors to process the collected data from different radiation sources in parallel. This will dramatically increase the data collection speed, which could be very useful in some time-sensitive applications.

One more strategy to increase processing speed is to find any parameters that can be pre-calculated for each different radiation source. Those parameters are saved for each radiation source individually so that processing time can be reduced. One example is to pre-calculate the position of the imaginary detector positions, settle the interpolation scheme, and simply perform the calculation to get the final result.

Figure 8:
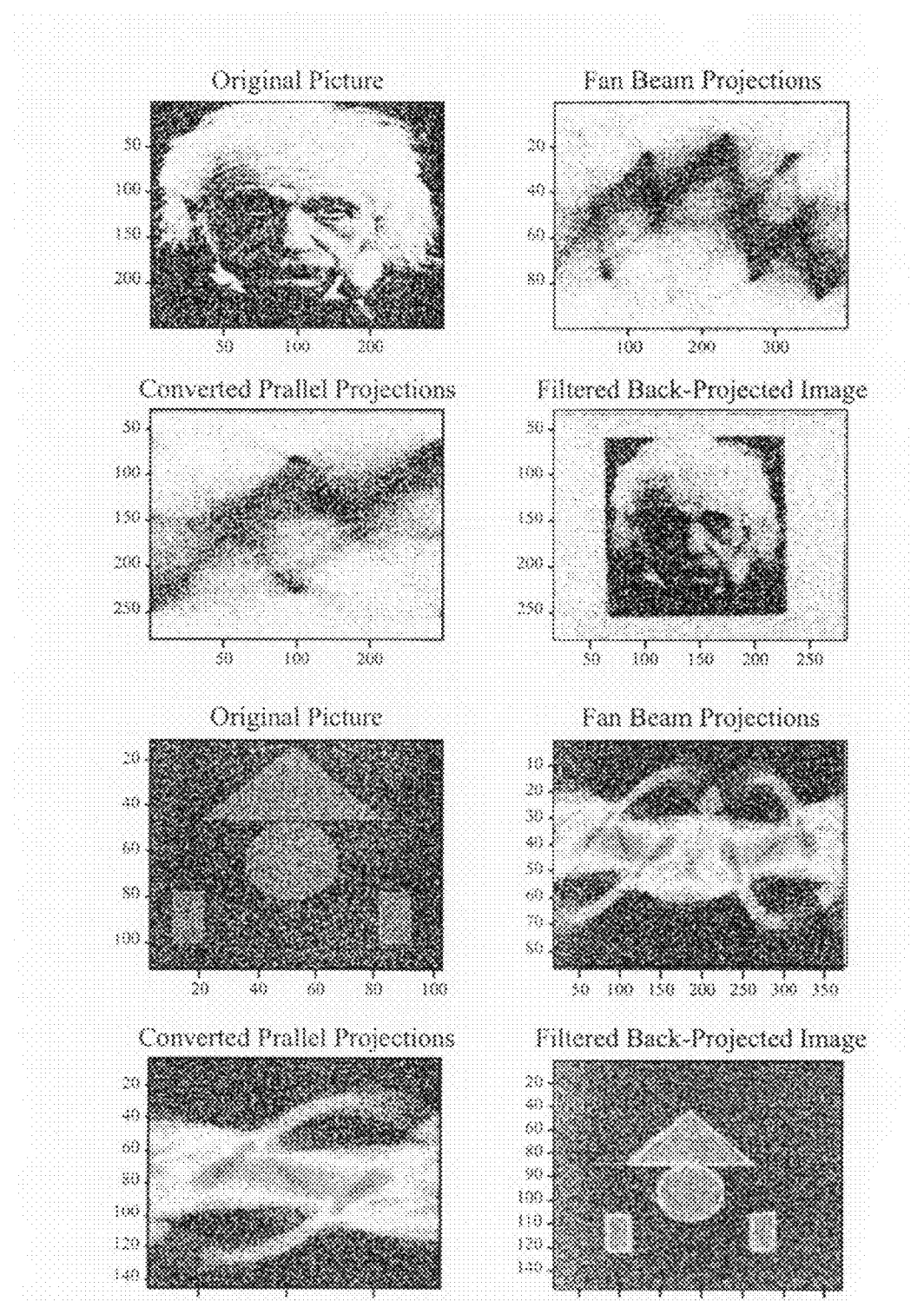
FIG. 8 illustrates the results of a demonstration of the success of the reconstruction method.

FIG. 8 shows the results of a demonstration of the success of the reconstruction method. The figure shows two test cases. In each case, the original picture (image) is shown in the upper left hand frame. The fan beam projections are shown in the upper right hand frame. The converted parallel projections are shown in the lower left hand frame. The reconstructed image is shown as the filtered back-projected image in the lower right hand frame. The first case is a picture of Prof. Albert Einstein. The second case is a picture of geometrical objects, such as might be used in the emulator tests in which the required number of radiation sources and detectors is determined for a desired spatial resolution.

The two cases used a circular radiation sources/detectors configuration, which surrounded the subject image. All of the radiation sources/detectors are situated on the circumscribing circle just outside of the subject image. The x-axis of the fan-beam projection diagram (frame) is the angle of the projection while the y-axis is the signal intensity. In this example, the fan-beam is converted into the corresponding parallel beam, which is not a unique implementation of the method.

What is claimed is:

1. A method for fast data acquisition for image reconstruction using computerized tomography comprising:
    arranging on an image-confining contour a probing radiation source that emits a fan beam and a set of real detectors, said image-confining contour being immediately outside of a boundary or perimeter of a subject image, said set of real detectors being neither equally spaced on a straight line nor situated equi-angularly on a curve;
    collecting amplitude scaled signals of said set of real detectors, said scaled signals comprising a real projection data set associated with said set of real detectors;
    mapping said real projection data set onto an imaginary contour resulting in an imaginary projection data set, wherein said imaginary contour has been selected so that the geometry is a known configuration for image reconstruction by known fan beam projection image reconstructions algorithms;

performing an interpolation of the imaginary projection data set to obtain an interpolated imaginary detector data set that corresponds to a set of imaginary detectors, said set of imaginary detectors being either equally spaced on a straight line or situated equi-angularly on a curve; and performing image reconstruction using known or fan beam image reconstruction algorithms on said interpolated imaginary detector data set;

wherein said probing radiation source and said set of real detectors are arranged on said image-confining contour in a static manner such that said probing radiation source and said set of real detectors do not move in relation to the subject image during said step of collecting amplitude scaled signals of said set of real detectors.

2. The method of claim 1 wherein said image-confining contour comprises a circle, a rectangle, or a square.

3. The method of claim 1 wherein said image-confining contour comprises a circle and wherein said imaginary contour comprises a curve; wherein said image reconstruction is performed using an equi-angular fan beam back projection approach; and wherein the angle of rays for two neighboring imaginary detectors from said probing radiation source remains a constant, said angle being one-half of the angle of rays for two neighboring real detectors from the center of the circle.

4. The method of claim 1 wherein said image-confining contour comprises a square, wherein said probing radiation source and said set of real detectors are deployed along said square equally spaced, and wherein said imaginary contour comprises a straight line perpendicular to the line from said probing radiation source to the center of said square.

5. The method of claim 4, wherein said interpolation is performed using either a linear interpolation or a Lagrange interpolation; and wherein said image reconstruction is performed using an equi-spaced fan beam back projection.

6. The method of claim 1, wherein said image-confining contour comprises an irregular shape, wherein said set of imaginary detectors is situated on a straight line that is perpendicular to a line that passes through said probing radiation source and the center of a subject image.

7. The method of claim 1, further comprising predetermining and pre-calculating an interpolation scheme for said probing radiation source.

8. The method of claim 7, wherein said image-confining contour comprises an irregular shape.

9. The method of claim 1, wherein said probing radiation source comprises a set of radiation sources.

10. The method of claim 9, wherein the set of radiation sources are neither equally spaced on a straight line nor situated equi-angularly on a curve.

* * * * *